Dec. 23, 1958         W. I. BALLENTINE, JR., ET AL         2,866,078
APPARATUS FOR WELDING VERTICAL SEAMS
Filed March 5, 1957                                  3 Sheets-Sheet 3
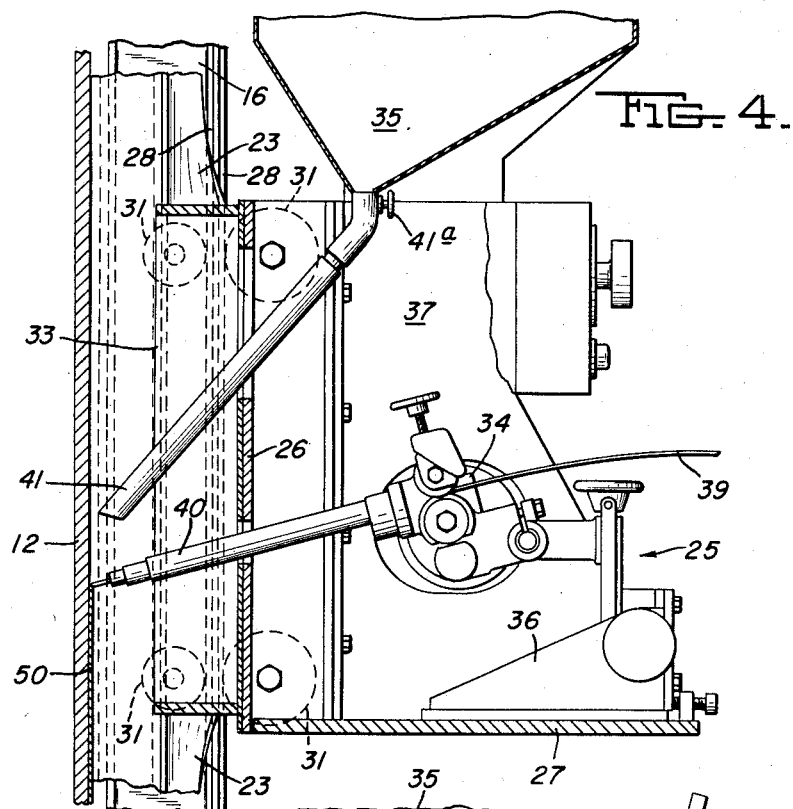
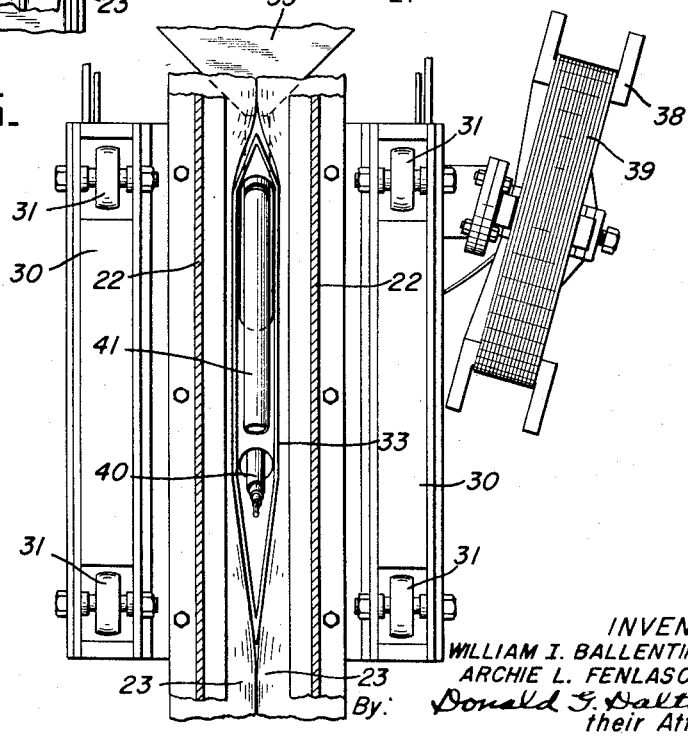
INVENTORS,
WILLIAM I. BALLENTINE, JR,
ARCHIE L. FENLASON
By: Donald G. Dalton
their Attorney.

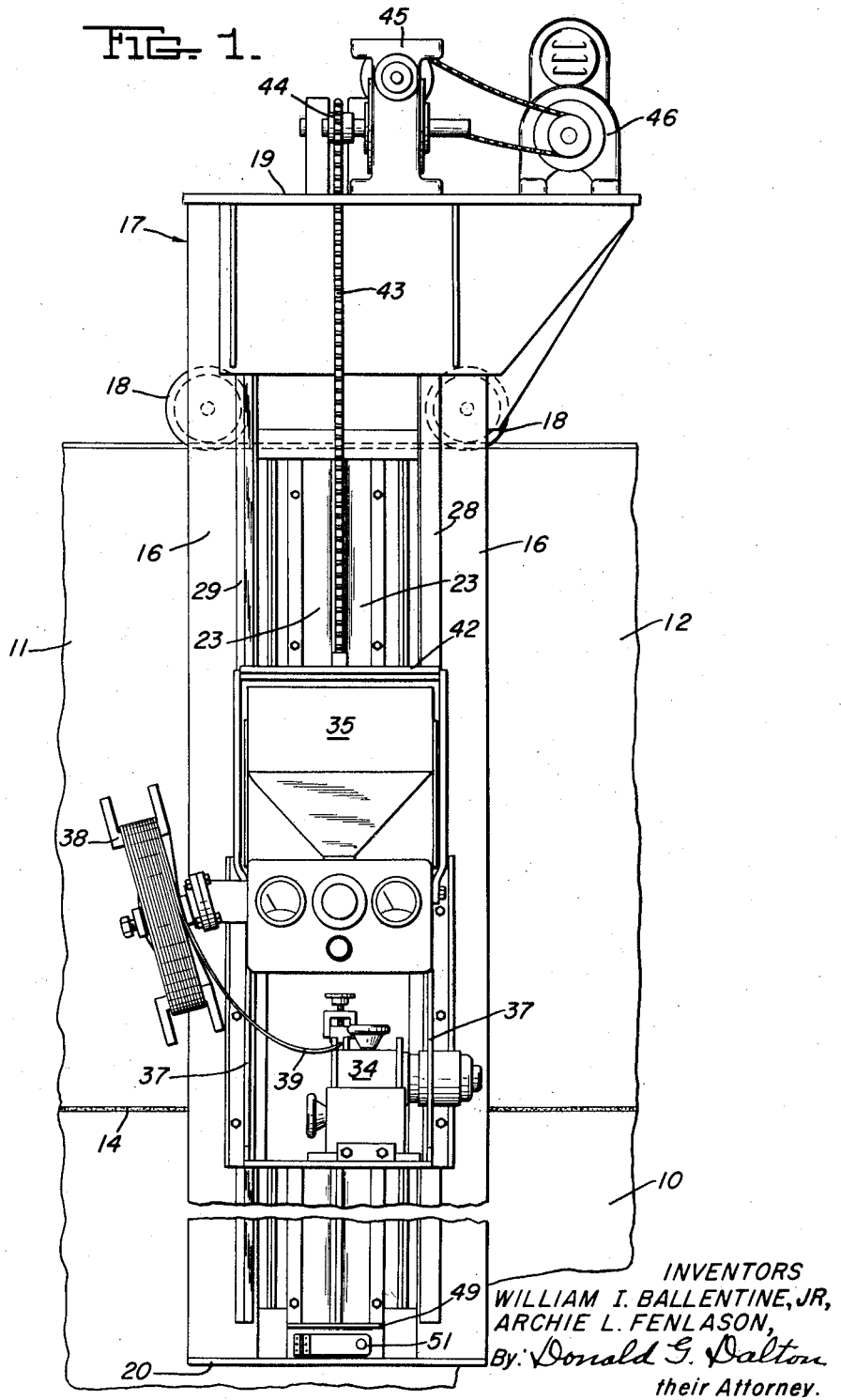

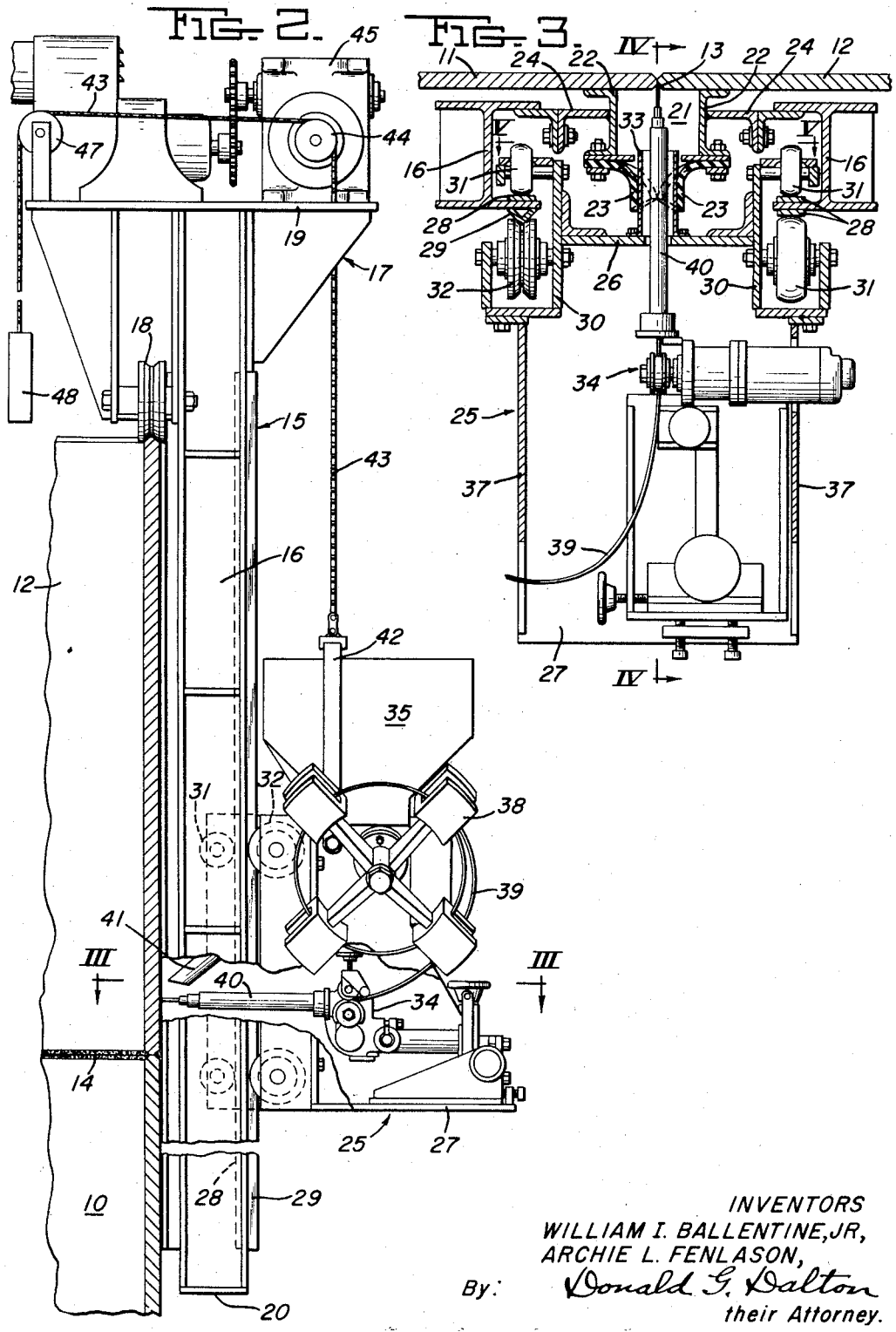

United States Patent Office 2,866,078
Patented Dec. 23, 1958

2,866,078

APPARATUS FOR WELDING VERTICAL SEAMS

William I. Ballentine, Jr., Whittier, and Archie L. Fenlason, El Monte, Calif., assignors to United States Steel Corporation, a corporation of New Jersey Application March 5, 1957, Serial No. 644,015

7 Claims. (Cl. 219—126)

This invention relates to electric-welding and, in particular, to a machine for progressively welding a seam uniting the abutting edges of metal plates disposed side-by-side and substantially vertically, i. e., as in a circular course of plates constituting part of the wall of a large oil-storage tank.

Machines are known for welding progressively the horizontal seams joining the adjacent edges of metal plates disposed vertically, one on the other as in a tank wall. The object of our invention is to provide means for welding the vertical seams between such plates, i. e., seams joining the abutting edges of plates disposed side-by-side.

In a preferred embodiment of the invention, we provide a frame adapted to hang from the upper edges of adjoining plates disposed vertically side-by-side. A flux box extending along the frame is open at one side and is adapted at such side to engage the plates, straddling the joint therebetween. The outer wall of the box is composed of strips of material yieldingly engaging each other at their adjacent edges. A carriage traveling along said frame has flux-supplying means and welding means with members extending between said strips. The carriage preferably includes gate means through which said members extend, adapted progressively to displace and spread the adjacent edges of the strip as the carriage moves along the frame.

A complete understanding of the invention may be obtained from the following detailed description and explanation which refer to the accompanying drawings illustrating the present preferred embodiment. In the drawings:

Figure 1 is an elevation showing the exterior of the machine of our invention, in working position on a tank wall;

Figure 2 is a side elevation looking from the left in Figure 1, showing the tank wall in vertical section;

Figure 3 is a horizontal section through the machine and tank wall, taken along the plane of line III—III of Figure 2;

Figure 4 is a vertical section through the machine taken along the plane of line IV—IV of Figure 3; and Figure 5 is a partial elevation showing the interior of the carriage as it would be projected on the plane of line V—V of Figure 3, with parts in section.

The flux has been omitted from Figures 2 through 5 to avoid obscuring the working elements.

Referring now in detail to the drawings and, for the present, particularly to Figures 1 through 3, a tank wall or the like is composed of curved plates 10, 11 and 12 disposed in horizontal courses, one standing on the other, the adjacent vertical edges of plates in side-by-side relation being in abutment at a vertical joint 13. The horizontal seams uniting the plates are shown at 14. A frame 15 comprises spaced legs 16 in the form of H-beams, depending from a head 17. The head has grooved wheels 18 journaled therein adapted to roll on the upper edge of plates 11 and 12. Legs 16 are connected at their upper and lower ends by top and bottom plates 19 and 20, respectively.

Between legs 16, on the inner or tank side thereof, is a flux box 21 having side walls of channels 22, and an outer wall composed of flexed strips of rubber-like material 23 secured to the channels. These strips tend yieldingly to engage each other. Channels 22 are carried by legs 16, by means of webs 24 welded to the channels and to the inner adjacent flanges of the legs. The inner side of the box 21 is open. When the frame is in position for welding of joint 13, channels 22 straddle the joint. Box 21 extends along the frame for substantially the full length thereof, or at least from a point below seam 14 to a point above the upper edges of plates 11 and 12 so that the full length of joint 13 may be welded by means about to be described.

A carriage 25 comprising a wall 26 and a shelf 27 is adapted to travel along legs 16. To this end, the legs are provided with rails 28 and 29 along the inner and outer faces of their outer adjacent flanges and the carriage has wheel boxes 30 extending along the side edges of wall 26. Plain rollers 31 journaled in the wheel boxes travel along rails 28 and grooved rollers 32 travel on V-rail 29. Gate means in the form of a short, flattened or oval tube 33 (see Figures 4 and 5) extends from wall 26 between the contacting edges of strips 23, spreading them apart in the region which the vertical dimension of the tube covers. When the carriage moves along the legs 16, gate tube 33 progressively separates the edges of strips 23 in the direction of travel and permits them to reclose progressively behind it.

Carriage 25 is provided with an automatic arc-welding head 34 of known construction and a flux-supplying hopper 35. The head 34 is adjustably mounted on a bracket 36 and a hopper 35 is carried on spaced side plates 37 forming part of the carriage 25. A holder 38 mounted on one of the side plates carries a coil of electrode wire 39 to be fed to the joint 13 as a seam is welded therein. Head 34 includes a guide tube 40 for the electrode, which extends through a hole in wall 26 to a point closely adjacent the joint to be welded. A discharge tube 41 extends from hopper 35 through a hole in wall 26 to a point above the end of tube 40. Tube 41 has a control valve 41a therein.

Carriage 25 is suspended by a bail 42 pivoted to side plates 37 and a chain 43 extending upwardly therefrom to head 17. The chain is trained over the output or driving sprocket 44 of a worm-gear reducer 45 driven by a motor reducer 46, both of which are mounted on top plate 19. From the driving sprocket 44, chain 43 continues over an idler sprocket 47 and suspends a counterweight 48 on the inside of the tank wall. A stop plate 49 between legs 16 limits downward movement of the carriage 25.

In operation of the apparatus described, frame 15 is adjusted along plates 11 and 12 by hand until channels 22 are about equidistant from joint 13. With carriage 25 at a level such that welding electrode 39 is at the lower end of the joint, flux is fed from hopper 35 into box 21 by opening valve 41a until its level is somewhat above the electrode. The flow then stops until tube 41 rises above the flux in the box. Automatic welding head 34 is then started into operation and motor reducer 45 is energized to turn sprocket 44 slowly. Carriage 25 is thus hoisted up the length of joint 13 which is progressively welded thereby as shown at 50. As the carriage rises, gate tube 33 progressively spreads the edges of strips 23 which reclose immediately behind the tube, because of their resilience.

The flow of flux through tube 41 starts as soon as the tube rises above the pre-existing flux level. The flow of flux and the speed of travel of the carriage are so correlated that the advancing arc is kept well covered. On completion of the welding of the joint, operation of the welding head is shut off and motor reducer 45 is reversed to lower the carriage against stop plate 49. Unused flux is then drained from box 21 by opening a door 51, and the apparatus is ready for welding another joint.

It will be apparent from the foregoing that the invention provides a simple and effective means for the welding of vertical seams by the submerged-arc process. The arc is kept blanketed by a continuous supply of flux delivered as the welding proceeds and the flux is held in place after completion of the weld, thus preventing the gravity flow of weld metal while it is in a fused state. The flux not consumed may be recovered for further use. The operation of the machine may be easily controlled since the only manipulations involved are the starting and stopping of the welding head and the carriage-driving motor.

Although we have disclosed herein the preferred practice and embodiment of our invention, we intend to cover as well any change or modification therein which may be made without departing from the spirit and scope of the invention.

We claim:

1. Apparatus for welding a seam uniting the abutting adjacent edges of metal plates disposed side-by-side and substantially vertically, comprising a frame adapted to rest on the upper edges of said plates, said frame including spaced depending rails, a carriage adapted to travel along said rails, welding means mounted on said carriage, spaced vertical flux-confining walls carried on said rails, respectively, and extending forwardly from said welding walls, adapted to straddle the seam, said means including a pair of displaceable strips of rubber-like material having their adjacent edges in contact, flux-supplying means mounted on said carriage, said welding means and said flux-supplying means including tubular members extending between said strips, and means for effecting movement of said carriage along said rails.

2. Apparatus as defined by claim 1, characterized by gate means on said carriage extending between said strip and adapted progressively to spread their edges, said members extending through said gate means.

3. Apparatus as defined by claim 1, characterized by said frame having wheels rolling on said upper edges of said plates.

4. Apparatus as defined by claim 1, characterized by said carriage having wheels traveling on said rails.

5. Apparatus as defined by claim 1, characterized by said strips having their adjacent edges curving away from said plates.

6. Apparatus for welding a seam uniting the abutting adjacent edges of metal plates disposed side-by-side and substantially vertically, comprising an elongated flux box open at one side adapted to be disposed against said plates with the open side straddling said seam, the opposite side of said box including a displaceable strip of rubber-like material, flux-supplying means and welding means mounted to travel along said box, and gate means moving with said flux-supplying and welding means adapted progressively to displace said strip and afford access to said box.

7. Apparatus as defined by claim 6, characterized by said opposite side of said box including a pair of strips of rubber-like material disposed side-by-side with their adjacent edges yieldingly engaging each other, said gate means extending between said strip edges.

References Cited in the file of this patent

UNITED STATES PATENTS

| | | |
|---|---|---|
| 1,886,776 | Brophy | Nov. 8, 1932 |
| 2,677,036 | Meyer et al. | Apr. 27, 1954 |
| 2,737,565 | Meyer | Mar. 6, 1956 |
| 2,742,553 | Meyer | Apr. 17, 1956 |

UNITED STATES PATENT OFFICE

CERTIFICATE OF CORRECTION

Patent No. 2,866,078                                                               December 23, 1958

William I. Ballentine, Jr., et al.

It is hereby certified that error appears in the printed specification of the above numbered patent requiring correction and that the said Letters Patent should read as corrected below.

Column 3, line 34, for "walls" read -- means --; line 35, for "means" read -- walls --.

Signed and sealed this 14th day of April 1959.

(SEAL)
Attest:

KARL H. AXLINE                                               ROBERT C. WATSON
Attesting Officer                                           Commissioner of Patents